US009428005B2

(12) United States Patent
Fabris et al.

(10) Patent No.: US 9,428,005 B2
(45) Date of Patent: Aug. 30, 2016

(54) BICYCLE COMPONENT COMPRISING A BODY MADE FROM ALUMINIUM AND A BODY MADE FROM COMPOSITE MATERIAL, AND METHOD FOR MANUFACTURING SUCH A COMPONENT

(71) Applicant: CAMPAGNOLO S.r.l., Vicenza (IT)

(72) Inventors: Paolo Fabris, Brendola (IT); Mauri Feltrin, Nanto (IT)

(73) Assignee: Campagnolo S.r.l., Vicenza (IT)

( * ) Notice: Subject to any disclaimer, the term of this patent is extended or adjusted under 35 U.S.C. 154(b) by 84 days.

(21) Appl. No.: 14/137,013

(22) Filed: Dec. 20, 2013

(65) Prior Publication Data

US 2014/0178704 A1 Jun. 26, 2014

(30) Foreign Application Priority Data

Dec. 21, 2012 (IT) .............................. MI2012A2229

(51) Int. Cl.
*B60B 5/00* (2006.01)
*B62M 3/00* (2006.01)
*B60B 21/00* (2006.01)
(Continued)

(52) U.S. Cl.
CPC . *B60B 5/00* (2013.01); *B60B 5/02* (2013.01); *B60B 21/08* (2013.01); *B62M 3/00* (2013.01); *C23C 8/10* (2013.01); *F16C 3/22* (2013.01); *F16C 11/02* (2013.01);
(Continued)

(58) Field of Classification Search
CPC ........... F16C 3/22; F16C 11/02; B62M 3/00; Y10T 74/2164; H05K 2203/0726; B23B 27/00; C23C 8/10; B60B 5/00; B60B 5/02; B60B 21/08; B60B 2360/3416; B60B 2360/104

USPC ..................................... 74/594.1; 428/472.2
See application file for complete search history.

(56) References Cited

U.S. PATENT DOCUMENTS 7,883,157 B2 * 2/2011 Theilig ................... B29C 70/84
                                                      301/64.704
7,959,236 B2 * 6/2011 Mercat ................... B60B 1/003
                                                      152/381.6
(Continued)

FOREIGN PATENT DOCUMENTS

CN     201109342 Y        9/2008
CN  EP 2020306 A1 *  2/2009 ............... B60B 5/02
(Continued)

OTHER PUBLICATIONS

Machine translation of DE 102005032421 A1 obtained on Aug. 13, 2015.*

(Continued)

*Primary Examiner* — Adam D Rogers
(74) *Attorney, Agent, or Firm* — Volpe and Koenig, P.C.

(57) ABSTRACT

The invention relates to a bicycle component, for example a rim, comprising a body made from aluminium and a body made from composite material coupled with a first surface portion of the body made from aluminium. Such a first surface portion has been subjected to a deoxidation surface treatment. An adhesive substance has been then applied on at least part of said first surface portion for gluing the body made from aluminium to the body made from composite material. A second surface portion of the body made from aluminium has been subjected to an oxidation surface treatment with subsequent fixing of the oxide.

24 Claims, 11 Drawing Sheets

(51) Int. Cl.
    *F16C 3/22*       (2006.01)
    *C23C 8/10*       (2006.01)
    *B60B 5/02*       (2006.01)
    *B60B 21/08*     (2006.01)
    *F16C 11/02*     (2006.01)

(52) U.S. Cl.
    CPC . *B60B 2360/104* (2013.01); *B60B 2360/3416* (2013.01); *Y10T 74/2164* (2015.01)

(56) References Cited

U.S. PATENT DOCUMENTS

| | | | |
|---|---|---|---|
| 8,024,993 B2* | 9/2011 | Dal Pra | B29C 70/081 74/594.1 |
| 8,828,169 B2* | 9/2014 | Nonoshita | B62K 19/10 156/156 |
| 2005/0011304 A1* | 1/2005 | Chiang | B62M 3/00 74/594.1 |
| 2006/0143920 A1* | 7/2006 | Morrison | B32B 15/04 29/896.6 |
| 2013/0026816 A1* | 1/2013 | Kia | B60B 1/14 301/95.102 |

FOREIGN PATENT DOCUMENTS

| | | |
|---|---|---|
| DE | 102005032421 A1 | 1/2007 |
| TW | M438398 U1 | 10/2012 |
| WO | 2005058682 A2 | 6/2005 |

OTHER PUBLICATIONS

European Search Report dated Sep. 6, 2013 received in Italian priority application No. IT MI20122229.

* cited by examiner

FIG.4
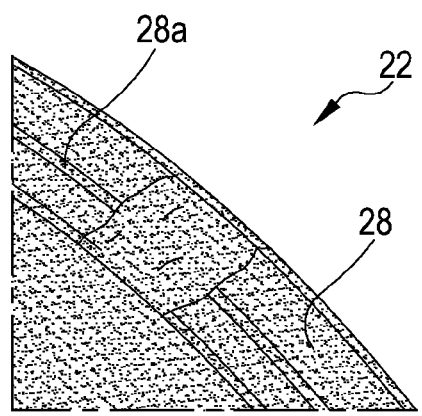
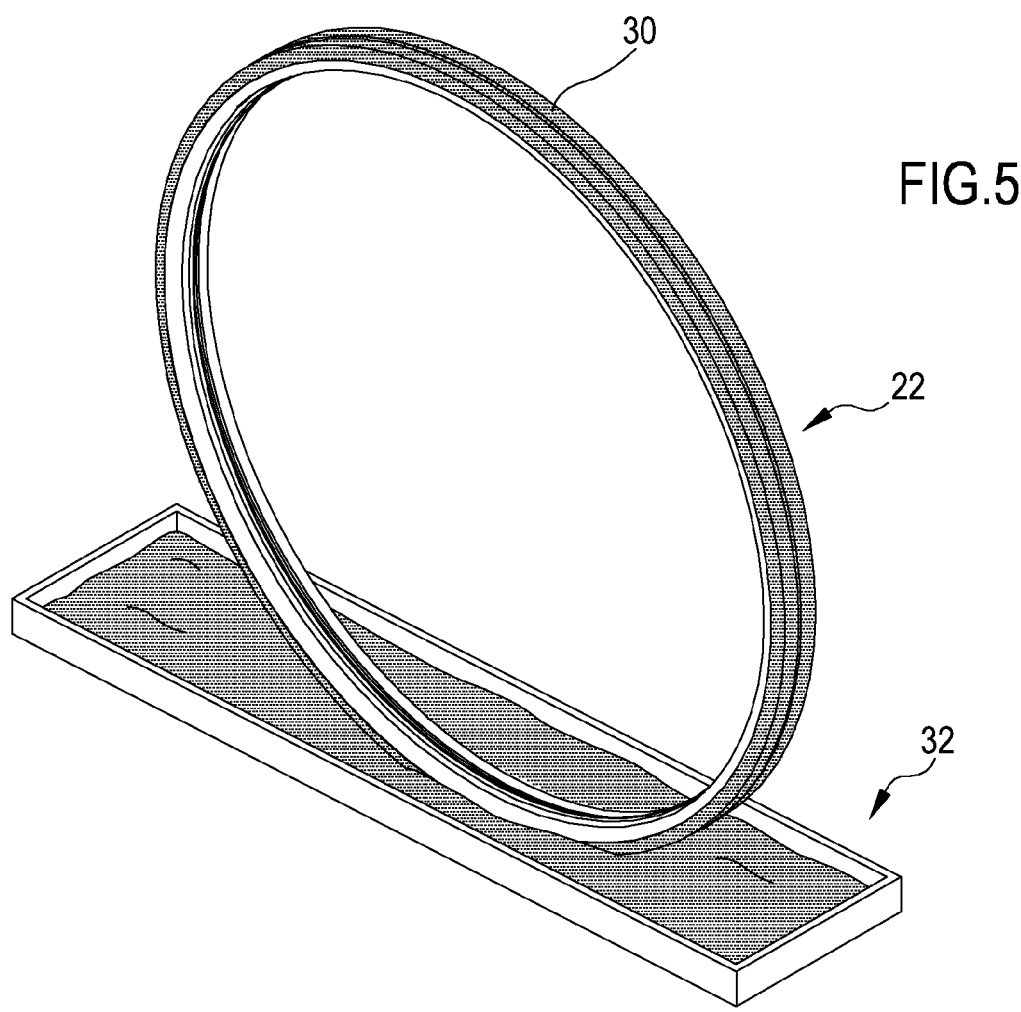
FIG.5

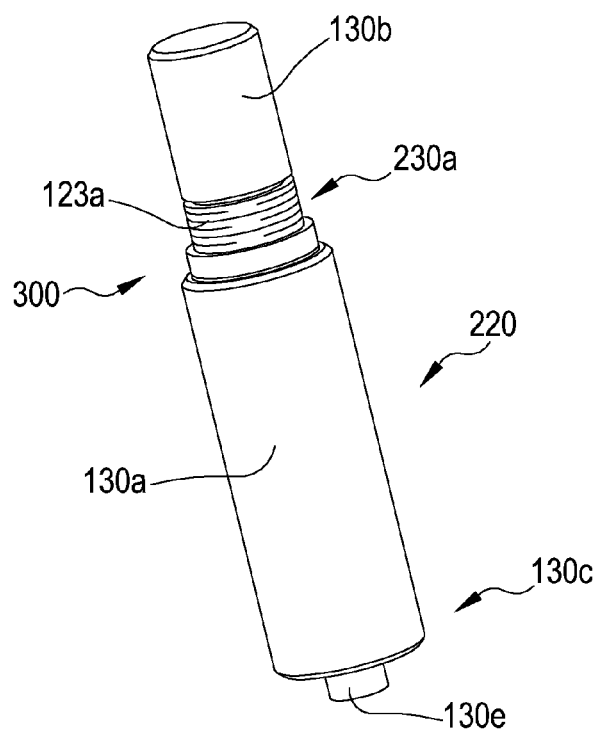
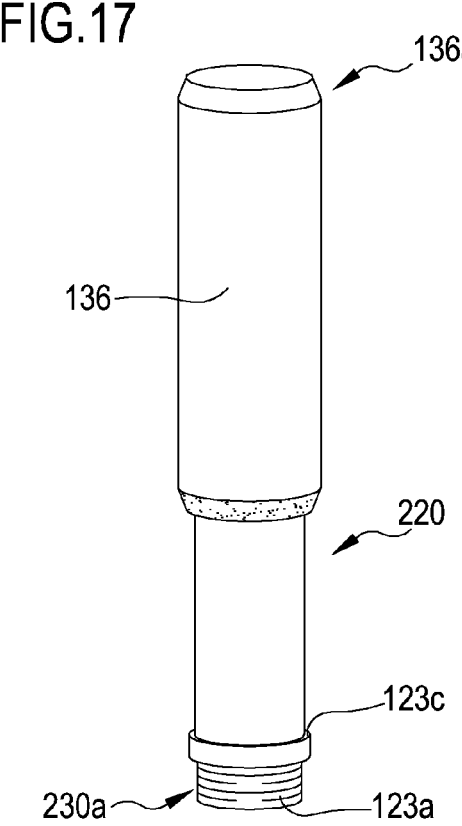
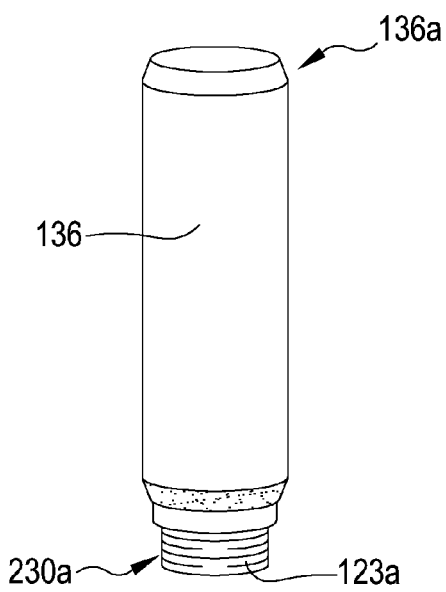
FIG.16
FIG.17
FIG.18

BICYCLE COMPONENT COMPRISING A BODY MADE FROM ALUMINIUM AND A BODY MADE FROM COMPOSITE MATERIAL, AND METHOD FOR MANUFACTURING SUCH A COMPONENT

FIELD OF INVENTION

The present invention relates to a bicycle component comprising a body made from aluminium and a body made from composite material, in which the body made from composite material is coupled with a surface portion of the body made from aluminium.

INTRODUCTION

Throughout the present description and in the subsequent claims, the expression "body made from aluminium" is used to indicate a body made from any aluminium alloy.

Throughout the present description and in the subsequent claims, the expression "body made from composite material" is used to indicate a body comprising structural fibres incorporated in a matrix of polymeric material, like for example carbon fibres or glass fibres incorporated in a thermoplastic or thermosetting polymeric resin.

The invention also relates to a method for manufacturing the aforementioned bicycle component.

In the rest of the description, for the sake of simplicity reference is made to two particular, non-limiting, cases of bicycle component according to the invention: a right crank arm assembly and a bicycle rim.

In the case of the right crank arm assembly, the body made from aluminium is a pin and the body made from composite material is a right crank arm. More specifically, the pin is a shaft or a half-shaft of a bicycle bottom bracket assembly. The shaft is coupled at its opposite ends, respectively, with the right crank arm and with the left crank arm, whereas the half-shaft is coupled at its opposite ends, respectively, with the right crank arm and with an end of a further half-shaft coupled, at an opposite end thereof, with the left crank arm.

In the case of the bicycle rim, the body made from aluminium is a radially outer ring and the body made from composite material is a radially inner ring. The aforementioned two rings form the bicycle rim on which the tyre (typically at the radially outer ring) and the spokes (typically at the radially inner ring) are mounted.

Bicycle components comprising bodies made from two different materials (typically aluminium and carbon fibres incorporated in a matrix of polymeric material) meet the market requirements for bicycles, in particular racing bicycles, of achieving ever lighter components, together with a satisfactory mechanical strength and reliability. This is obtained using aluminium where there is a need to ensure high mechanical performance (like in the case of the pin of the crank arm assembly) and/or specific mechanical performance (like in the case of the radially outer ring of the bicycle rim, where the braking tracks of the rim are typically made), and composite material in the remaining parts, so as to make the bicycle component as light as possible.

It is known in the field that there is a need to subject the surface of the body made from aluminium to an oxidation treatment, so as to protect such a body from corrosion.

For example, in the case of the bicycle rim, the annular element must withstand the corrosive action of the liquids used for mounting the tyre and of the possible tyre sealant products. Similarly, in the case of the right crank arm assembly, the pin must withstand the corrosive action of water, mud and the like, as well as of products used to lubricate the bottom bracket assembly.

It is also known in the field that there is a need to subject the body made from aluminium to a preparation treatment of the surface to be coupled by gluing with the body made from composite material.

For example, in the case of the bicycle rim, a suitable adhesive substance must be applied on the radially outer ring made from aluminium, the adhesive substance being suitable for ensuring a secure and stable gluing over the time with the radially inner ring made from composite material. Similarly, in the case of the right crank arm assembly, a suitable adhesive substance must be applied on the pin made from aluminium, the adhesive substance being suitable for ensuring a secure and stable gluing over the time with the right crank arm made from composite material.

SUMMARY OF THE INVENTION

The Applicant has found that it is possible to achieve excellent results in terms of resistance to corrosion by subjecting the body made from aluminium to an oxidation surface treatment with subsequent fixing of the oxide.

Such treatment can, for example, be one of the following:
1) anodising with sulphuric acid (SAA);
2) anodising with chromic acid (CAA) with an oxide thickness greater than or equal to 8 μm;
3) Plasma Electrolytic Oxidation (PEO).

The subsequent fixing can for example be fixing with nickel acetate, or hot fixing with $H_2O$ or other cold fixing systems.

The Applicant has also found that it is possible to achieve excellent results in terms of gluing by subjecting the body made from aluminium to a deoxidation surface treatment.

Such treatment can for example be an acid attack with sulphochromic mixture (FPL), to which anodising with chromic acid (CAA) with thickness lower than or equal to 4 μm, more preferably anodising with phosphoric acid (PAA), is preferably added.

The Applicant has, however, observed that the oxidation surface treatment is in many cases incompatible with the aforementioned deoxidation surface treatments. For example, carrying out one of the aforementioned deoxidation surface treatments on a surface subjected to anodising with sulphuric acid results in a degradation of the protective surface oxide (hereafter also called anodic oxide) thus obtained. Vice-versa, carrying out anodising treatment with sulphuric acid on a surface subjected to one of the aforementioned deoxidation surface treatments compromises the adhesive performance of the surface, in terms of gluing reliability and strength.

The anodising treatment with sulphuric acid therefore cannot be made in addition to the aforementioned deoxidation surface treatments, and vice-versa, on a same bicycle component, without the respective advantages in terms of resistance to corrosion and adhesive performance being lost.

The Applicant has observed that, due to the aforementioned incompatibility, the anodising treatment with sulphuric acid is typically combined with a sandblasting treatment or with a washing with solvents, or specific aqueous solutions, treatment. This last treatment, however, according to the Applicant, does not allow the treated surface to be given optimal characteristics in terms of gluing.

The technical problem forming the basis of the present invention is that of obtaining, in a bicycle component comprising a body made from aluminium and a body made from composite material, optimal characteristics both in terms of protection from corrosion and in terms of gluing between body made from aluminium and body made from composite material.

The Applicant has observed that gluing with the composite body takes place at a very limited part of the body made from aluminium and that in order to obtain excellent results in terms of gluing it is sufficient to limit the gluing preparation treatment to such a body part. The Applicant has also observed that it is possible to obtain excellent results in terms of resistance to corrosion also if the aforementioned body part is not subjected to a specific anticorrosion treatment, or also if the protective surface oxide provided on such a body part due to a previous anticorrosion treatment is subjected to degradation or is removed.

The Applicant has therefore found that the technical problem outlined above is solved by subjecting the body made from aluminium of the bicycle component both to an oxidation surface treatment and to a deoxidation surface treatment, taking care to carry out the deoxidation surface treatment only on the portion of the body made from aluminium intended for coupling with the body made from composite material and the oxidation surface treatment on the remaining portion of the body made from aluminium, or on the entire body made from aluminium provided that such treatment is carried out before the deoxidation treatment.

The present invention therefore relates, in a first aspect thereof, to a bicycle component, comprising:
a first body made from aluminium;
a second body made from composite material;
wherein said second body is coupled with a first surface portion of said first body;
wherein said first surface portion has been subjected to a deoxidation surface treatment;
wherein on at least part of said first surface portion an adhesive substance has been subsequently applied for gluing said first body to said second body;
wherein a second surface portion of said first body has been subjected to an oxidation surface treatment with subsequent fixing of the oxide.

In a second aspect thereof, the present invention relates to a method for manufacturing a bicycle component, said component comprising a first body made from aluminium and a second body made from composite material, said method comprising the following steps:
carrying out a deoxidation surface treatment on a first surface portion of said first body;
applying an adhesive substance on at least one part of said first surface portion thus treated;
coupling said second body with said first body at said at least one part of said first surface portion;
said method further comprising the step of carrying out an oxidation surface treatment with subsequent fixing of the oxide on at least one second surface portion of said first body.

The present invention can comprise, in one of the aforementioned aspects, one or more of the following preferred characteristics.

Preferably, the deoxidation surface treatment is an acid attack treatment with sulphochromic mixture (FPL).

Preferably, an anodising with chromic acid (CAA) with an oxide thickness lower than or equal to 4 µm, or more preferably an anodising with phosphoric acid (PAA), is also carried out.

Preferably, the anodising with chromic acid is carried out until an oxide thickness lower than or equal to 3 µm, more preferably lower than or equal to 2 µm, is reached.

Preferably, the oxidation surface treatment is an anodising treatment with sulphuric acid (SAA).

Preferably, the gluing between said first body and said second body is such that, after 1500 hours of immersion in water, there is a decrease in resistance to shearing stress lower than or equal to 20 MPa, preferably lower than or equal to 18 MPa, more preferably lower than or equal to 10 MPa, even more preferably lower than or equal to 5 MPa.

Advantageously, in the present invention the decrease in resistance to shearing stress of the gluing is less than what would be obtained using treatments different from the deoxidation treatments described above, for example using a sandblasting treatment or a washing with solvent treatment.

Preferably, the gluing between said first body and said second body is such as to ensure an initial resistance to shearing stress greater than 35 MPa, preferably greater than 40 MPa, more preferably equal to about 45 MPa.

Advantageously, in the present invention the initial resistance to shearing stress of the gluing is much greater than what would be obtained using preparation treatments of the gluing surface different from the deoxidation treatments described above, for example the aforementioned sandblasting treatment or washing with solvent treatment.

In a first preferred embodiment of the present invention, said first body is a pin of a right crank arm assembly and said second body is a right crank arm of said right crank arm assembly.

Preferably, in this first embodiment, said first surface portion comprises a threading for screwing the pin into the right crank arm.

In a second preferred embodiment of the present invention, said first body is a radially outer ring of a bicycle rim and said second body is a radially inner ring of said bicycle rim.

Preferably, in this second embodiment, said first body comprises a base surface and opposite side surfaces, wherein said first surface portion is defined at said base surface and at a radially inner circumferential portion of each of said opposite side surfaces.

Preferably, a respective braking track of the rim is defined at a radially outer circumferential portion of each of said opposite side surfaces.

Advantageously, thanks to the fact that the aforementioned braking tracks are defined on the body made from aluminium it is possible to achieve a particularly efficient braking.

Preferably, before applying said adhesive substance, a corrosion inhibiting paint is applied on said first surface portion.

Preferably, said oxidation surface treatment is carried out before carrying out any of said aforementioned deoxidation treatments.

This way of operating is advantageous from the operative point of view.

Preferably, before carrying out the deoxidation surface treatment said second surface portion is covered with a first protective element.

Advantageously, in this way the second surface portion is prevented from coming into contact with the substances used to carry out the deoxidation surface treatment.

Preferably, a seat for a tyre is defined at said radially outer ring between said opposite side surfaces.

Preferably, in the aforementioned second preferred embodiment of the present invention, in order to cover the aforementioned second surface portion the following actions are performed:
a filler element is inserted into said seat;

a removable protective film is applied onto said filler element and onto a radially outer circumferential portion of said radially outer ring.

Preferably, the protective film is a liquid polymer paint, which is then dried. For example, such a paint is a polymer in solution with about 45% xylene, whose viscosity is about 50 poises and density is about 1,026 g/cm$^3$. In particular, the paint called "Mask Acid" and commercialised by the company Turco Italiana can be used.

Preferably, the protective film is applied by partial immersion of the radially outer ring in a tank containing the liquid polymer paint. In particular, only a radially outer portion of the radially outer ring is dipped in the tank. By rotating the radially outer ring, the liquid polymer paint is applied along the all of the aforementioned radially outer circumferential portion.

Preferably, said radially outer ring comprises a hole for an inflation valve.

Preferably, before inserting said filler element into the seat for the tyre, said hole is covered with a first mask.

Advantageously, such a first mask prevents the substances used in the subsequent deoxidation surface treatment from entering inside the seat for the tyre.

Preferably, said radially outer ring comprises an area for an electrical contact.

Preferably, said area is covered with a second mask before carrying out said oxidation surface treatment.

Advantageously, such a second mask prevents protective surface oxide (produced by the oxidation surface treatment) from forming on the area for the electrical contact, which would prevent an optimal electrical contact.

Preferably, said second mask is removed before applying said protective film.

Advantageously, in this way the protective film is laid down uniformly along the entire radially outer circumferential portion of the radially outer ring of the rim.

Preferably, in the aforementioned second preferred embodiment of the present invention, said oxidation surface treatment is carried out on said first surface portion and second surface portion to form an anodic oxide on the entire radially outer ring of the rim. Afterwards, said anodic oxide is at least partially removed from said first surface portion before carrying out the deoxidation surface treatment.

Preferably, in the aforementioned first preferred embodiment of the present invention, the pin is hollow and before carrying out the deoxidation surface treatment the opposite end faces of said hollow pin are closed. This is in order to prevent the substances used in the deoxidation surface treatment from entering inside the cavity of the pin and attacking the anodic oxide formed in the previous oxidation surface treatment.

Preferably, before carrying out the oxidation surface treatment on said second surface portion of said first body, said first surface portion is covered with a second protective element.

Advantageously, in this way the first surface portion is prevented from coming into contact with the substances used in the oxidation surface treatment.

BRIEF DESCRIPTION OF THE DRAWINGS

Further characteristics and advantages of the present invention will become clearer from the following detailed description of a preferred embodiment thereof, made with reference to the attached drawings, given for indicating and not limiting purposes. In such drawings:

FIG. 1b schematically shows an enlarged perspective view of a detail of the bicycle wheel of FIG. 1a;

FIG. 4 schematically shows an enlarged perspective view of a detail of the aforementioned radially outer ring in a manufacturing step after that of FIG. 3;

FIG. 5 schematically shows a perspective view of the aforementioned radially outer ring in a manufacturing step after that of FIG. 4;

FIG. 12 schematically shows a perspective view of the aforementioned pin in a protective element after that of FIG. 10;

FIGS. 13-18 schematically show perspective views of the aforementioned pin in manufacturing steps after that of FIG. 12;

DETAILED DESCRIPTION OF THE PREFERRED EMBODIMENTS

With initial reference to FIGS. 1a, 1b, 1c and 2-7, a bicycle rim (and its parts) is shown, wholly indicated with 10, which constitutes a first embodiment of a bicycle component in accordance with the present invention.

Figure 1A:
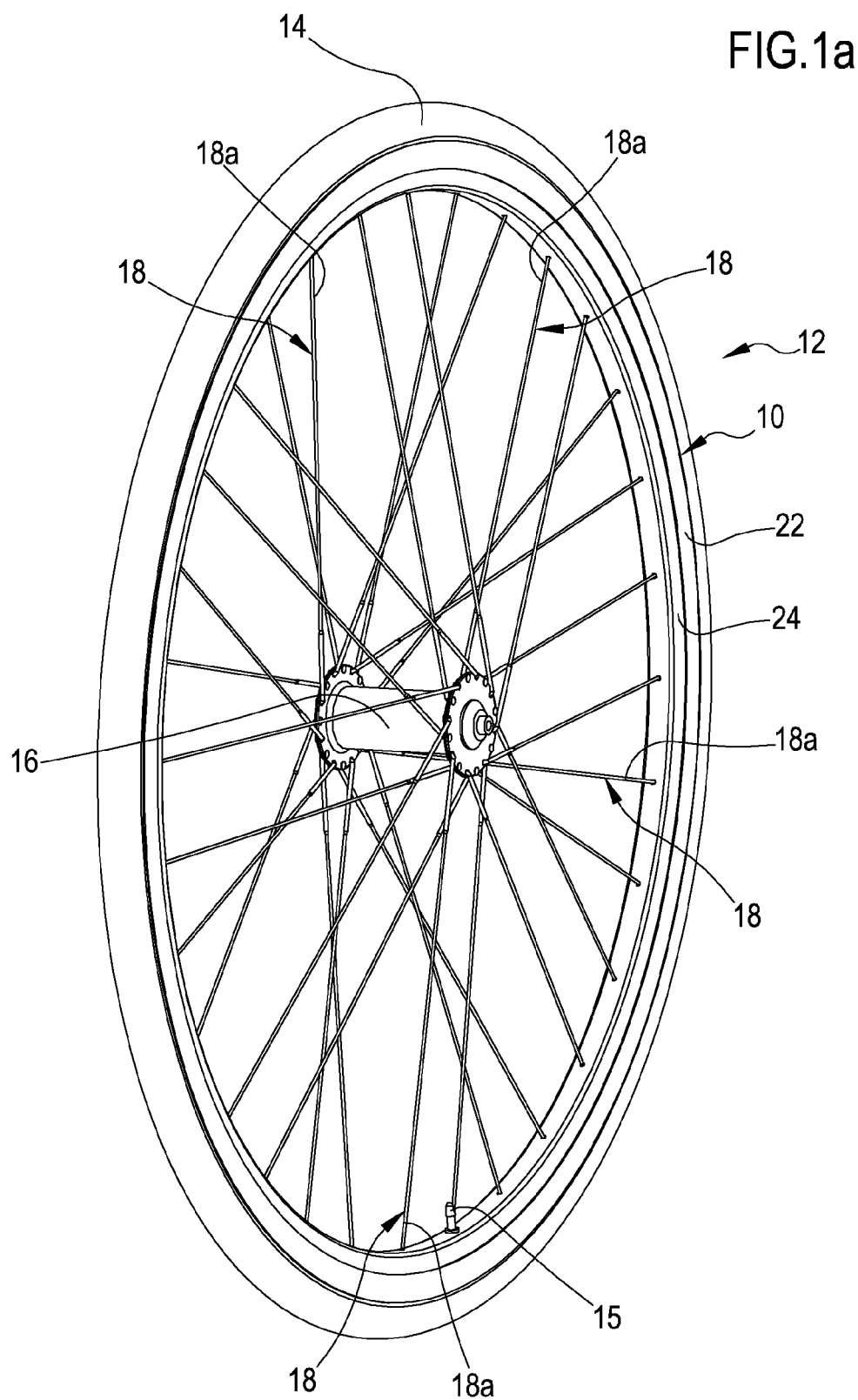
FIG. 1a schematically shows a perspective view of a bicycle wheel, including a bicycle rim according to the present invention.
Figure 1B:
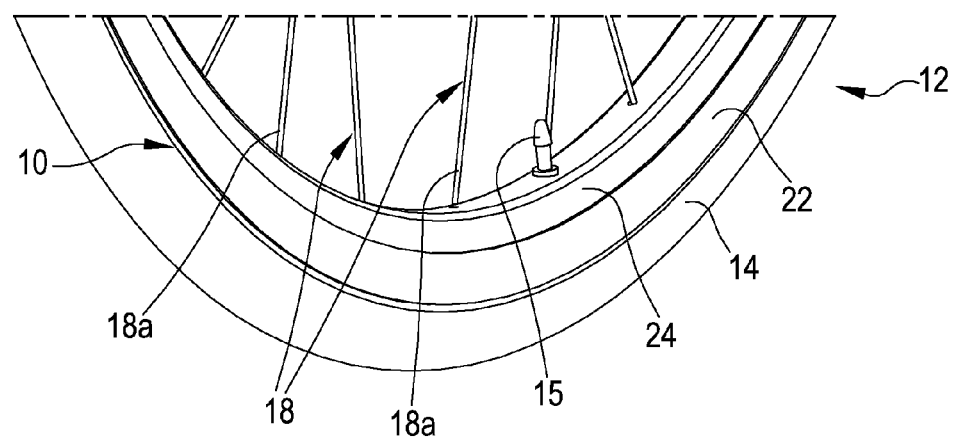

In FIGS. 1a and 1b it is shown a bicycle wheel 12 that comprises the rim 10, on which a tyre 14 is mounted. The rim 10 is connected to a hub 16 through spokes 18, reference numeral 18 being associated with just some of the aforementioned spokes.

The rim 10 comprises an annular structure formed of a radially outer ring 22 made from aluminium and a radially inner ring 24 made from composite material.

In particular, the tyre 14 is mounted in a seat 20 defined in a radially outer portion of the radially outer ring 22. The spokes 18 have respective radially outer ends 18a housed in respective seats (not shown) formed in a radially inner portion of the radially inner ring 24.

The radially outer ring 22 and the radially inner ring 24 are perforated for the insertion of an inflation valve 15 of the tyre 14. In particular, the inflation valve 15 is housed in a hole (not shown) formed in the seat 20 of the radially outer ring 22.

The radially inner ring 24 is coupled with a surface portion 23a of the radially outer ring 22. The remaining surface portion of the radially outer ring 22 is indicated with 23b.

Figure 1C:
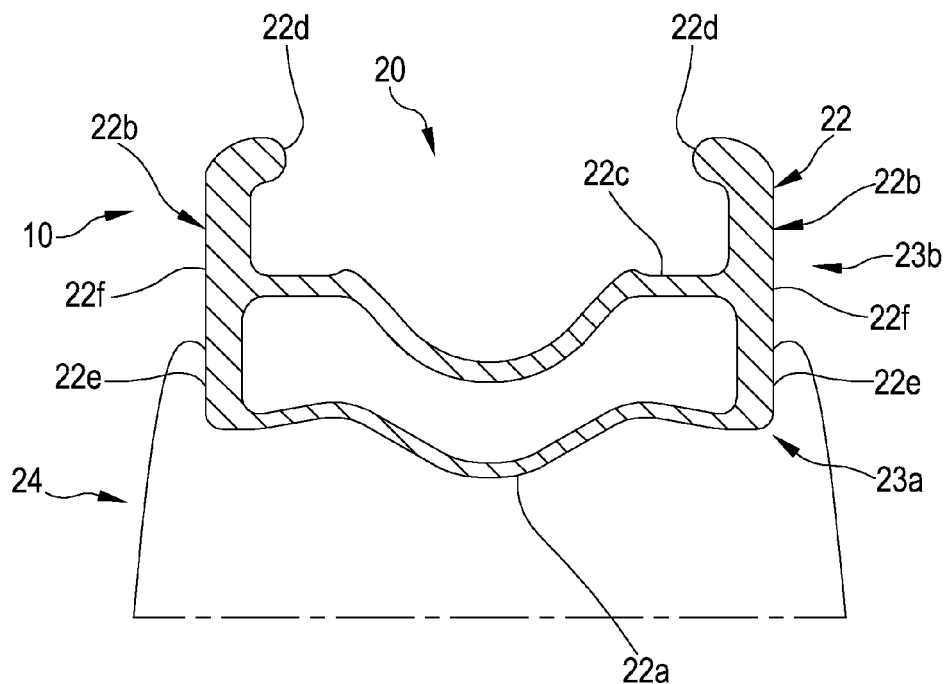
FIG. 1c schematically shows an enlarged radial section view of a part of the aforementioned bicycle rim, without the tyre.

As shown in FIG. 1c, the radially outer ring 22 comprises a base surface 22a and opposite side surfaces 22b.

The side surfaces 22b are connected, as well as by the base surface 22a, also by an intermediate surface 22c, arranged in radially outer position with respect to the base surface 22a.

The intermediate surface 22c defines the bottom of the seat 20. In operation, the tyre 14 is held in the seat 20 by the axially inner upper ends 22d of the side surfaces 22b.

The surface portion 23a is defined at the base surface 22a and at a radially inner circumferential portion 22e of each of the opposite side surfaces 22b.

A respective braking track of the rim 10 is defined at a radially outer circumferential portion 22f of each of the opposite side surfaces 22b.

In order to achieve the desired characteristics of resistance to corrosion, the surface portion 23b of the radially outer ring 22 is subjected to an oxidation surface treatment, preferably an anodising treatment with sulphuric acid (SAA), completed with fixing of the surface oxide, for example with nickel acetate.

As an alternative to anodising with sulphuric acid (SAA), it is possible to carry out anodising with chromic acid (CAA) with an oxide thickness greater than or equal to 8 µm, preferably comprised between 8 µm and 20 µm, or Plasma Electrolytic Oxidation (PEO).

In order to achieve excellent adhesion to the radially inner ring 24, the surface portion 23a of the radially outer ring 22 is subjected to a deoxidation surface treatment.

Preferably, such treatment is an acid attack with sulphochromic mixture (FPL).

Preferably, in addition to acid attack with sulphochromic mixture (FPL) anodising with chromic acid (CAA) with an oxide thickness lower than or equal to 4 µm, preferably lower than or equal to 3 µm, more preferably lower than or equal to 2 µm, is carried out.

More preferably, in addition to the acid attack with sulphochromic mixture (FPL) anodising with phosphoric acid (PAA) is carried out.

As an alternative to the sulphochromic mixture it is possible to use an alkaline solution or a solution with ferric sulphate.

Thereafter, a corrosion inhibiting paint is applied on the surface portion 23a. For example, it is possible to use a primer called "BR® 127" and commercialised by the company Cytec Industries Inc.

Thereafter, a suitable adhesive substance is applied on the part of the surface portion 23a of the radially outer ring 22 intended to be coupled with the radially inner ring 24.

Thanks to the fact that the surface portion 23a has been prepared for gluing with one of the aforementioned deoxidation surface treatments, the gluing between radially outer ring 22 and radially inner ring 24 has better characteristics of resistance to shearing stress with respect to those that would be obtained using gluing preparation treatments of a different type, like for example sandblasting or washing with solvent.

Figure 19:
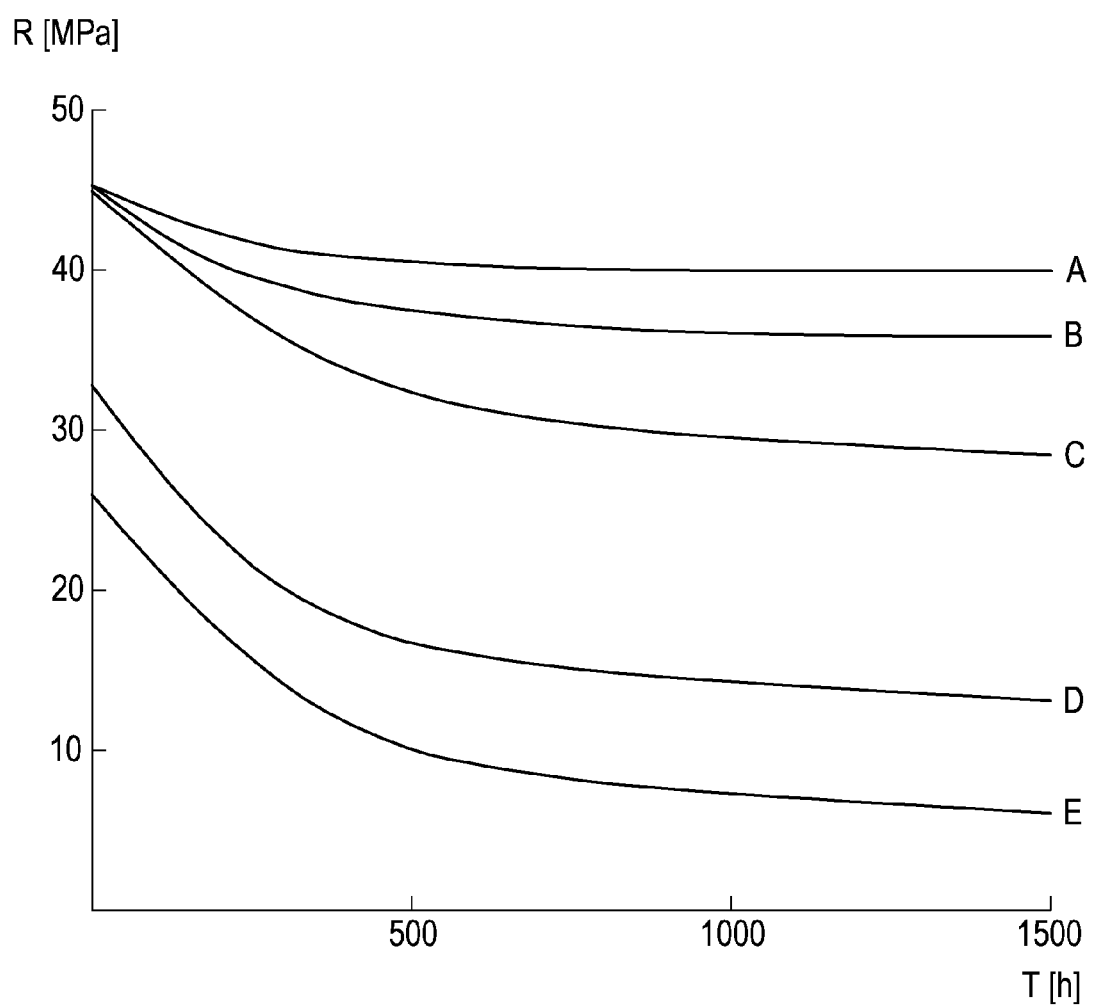
FIG. 19 shows a diagram of resistance to shearing stress as a function of the immersion time in water for different types of treatment which a body made from aluminium was subjected to, before gluing to a body made from composite material.

FIG. 19 shows a diagram of resistance to shearing stress R as a function of the time T of immersion in water for different types of treatment to which a first body made from aluminium was subjected before gluing to a second body made from composite material.

In particular, five curves A, B, C, D and E are shown, which correspond to the following treatments, respectively:

A=acid attack with sulphochromic mixture and anodising with phosphoric acid (FPL+PAA);

B=acid attack with sulphochromic mixture and anodising with chromic acid (FPL+CAA) with an oxide thickness lower than or equal to 4 µm;

C=acid attack with sulphochromic mixture (FPL);

D=sandblasting;

E=washing with solvent.

It should be noted that the curves A, B and C start from an initial resistance to shearing stress value R of about 45 MPa, much greater than that of curves D and E.

The curves A, B and C have a decreasing progression such that, after 1500 hours of immersion in water, there is a decrease in resistance to shearing stress R of about 5 MPa for the curve A, 10 MPa for the curve B and 18 MPa for the curve C. Such decreases are much smaller than to those of the curves D and E, thus demonstrating the better effectiveness of the deoxidising surface treatments of the invention with respect to those of another type.

From the operating point of view, the method for manufacturing the rim 10 comprises the following steps shown in FIGS. 2-7. Such figures show in particular the processing steps which the radially outer ring 22 is subjected to.

At first a shotblasting/sandblasting of the radially outer ring 22 is carried out. The radially outer ring 22 is for this purpose inserted in a shot blaster/sandblaster without any protection. The shotblasting/sandblasting cycle lasts about 4 minutes. Preferably, a stainless steel grit called "Graninox Pometon Cr/Ni 20" is used.

Figure 2:
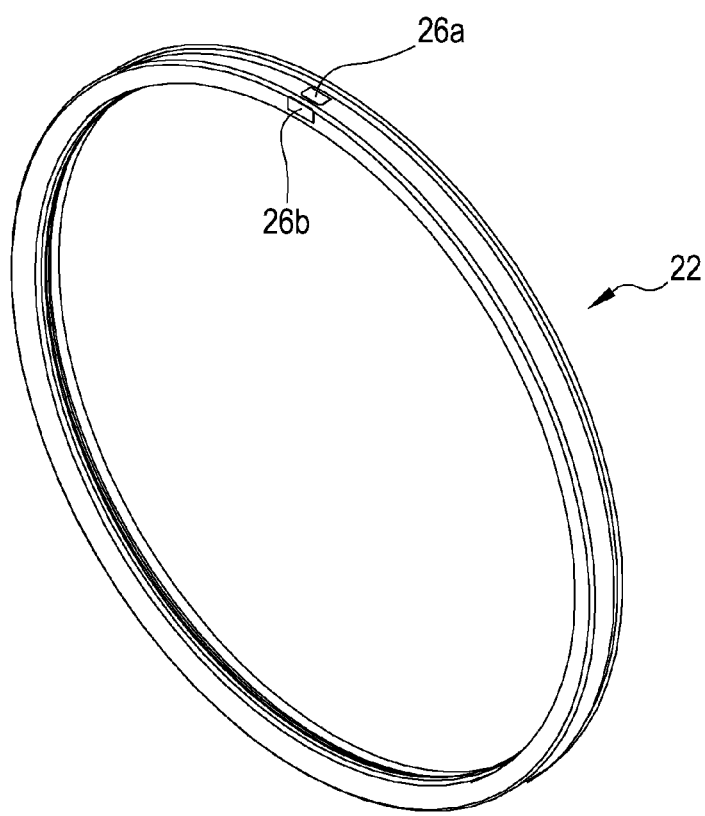
FIG. 2 schematically shows a perspective view of a radially outer ring of the bicycle rim of FIG. 1a, in a manufacturing step thereof.
Figure 3:
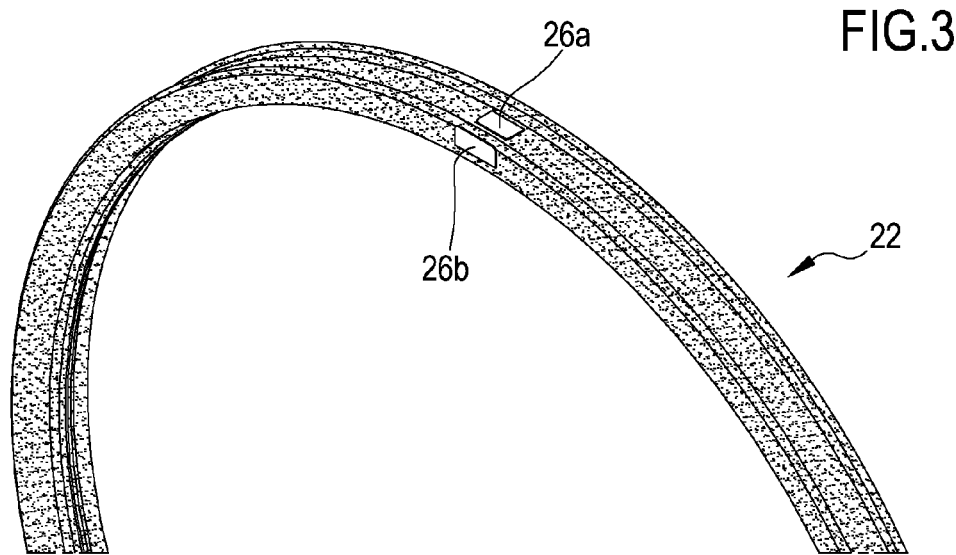
FIG. 3 schematically shows a perspective view of the aforementioned radially outer ring in a manufacturing step after that of FIG. 2.

As shown in FIG. 2, a mask 26a is applied on the radially outer ring 22 thus obtained at the hole for the inflation valve 15. Such a mask 26a is applied, in particular, on the radially outer wall of the intermediate surface 22c of the seat 20, so as to cover the aforementioned hole.

Moreover, a mask 26b is applied on a portion of the axially outer wall of one of the two side surfaces 22b of the radially outer ring 22, substantially at the position of the hole for the inflation valve 15. Such an area is intended to cooperate with an electrical contact.

Preferably, the masks 26a and 26b are obtained by applying a liquid polymer paint with a brush. In particular, the paint called "Mask Acid" described above can be used. The drying of such a paint can take place in air or be accelerated with hot air.

The radially outer ring 22 thus prepared is subjected to anodising treatment with sulphuric acid (also called black sulphuric anodising), preferably with fixing at 98° C. in aqueous nickel acetate solution. The thickness of the layer of anodic oxide that forms on the entire surface of the radially outer ring 22 (with the exception of the areas protected by the masks 26a and 26b) is typically comprised in the range between 8 and 20 µm.

Thereafter, a filler element 28 is inserted into the seat 20, as illustrated in FIG. 4. Preferably, the filler element 28 is a strip of elastomeric material, for example a fluoroelastomeric material, having a substantially rectangular section. Such a strip has a length corresponding to the circumferential extension of the seat 20, so that the strip is closed in a loop by joining head-tail the two ends of the strip. Preferably, such a filler element 28 has a circumferential recessing 28a, which is arranged radially outside, when the filler element 28 is arranged in the seat 20.

The strip of elastomeric material is cut to size and inserted manually in the seat 20. The two ends of the strip are matched up. The head-tail join of the two ends is sealed by applying the liquid polymer paint (in particular the "Mask Acid" paint) with a brush.

Thereafter, as shown in FIG. 5, a removable protective film 30 is applied on a radially outer circumferential portion of the radially outer ring 22 that has been treated previously. Such a removable protective film 30 protects the surface portion of the radially outer ring 22 from the substances used in the subsequent deoxidation surface treatment. Therefore, part of the aforementioned surface portion 23b of the radially outer ring 22 corresponds to the surface portion of the radially outer ring 22 covered by the removable protective film 30.

The removable protective film 30 is preferably a liquid polymer paint (for example the "Mask Acid" paint), which is then dried.

The removable protective film 30 is preferably applied by immersion in a tank 32 containing the liquid polymer paint of just a radially outer portion of the radially outer ring 22. By rotating the radially outer ring 22, the liquid polymer paint is applied along all of the aforementioned radially outer circumferential portion of the radially outer ring 22.

For this purpose, the radially outer ring 22 is mounted on a spoke-type support (not shown) and made to rotate with a predetermined speed. The liquid polymer paint of the tank 32 wets about half of the height of the side surface 22b of the radially outer ring 22.

Keeping the radially outer ring 22 in rotation, it is lifted from the tank 32 in order to eliminate the excess liquid polymer paint.

The radially outer ring 22 thus treated is subsequently introduced into a drying chamber.

Figure 6:
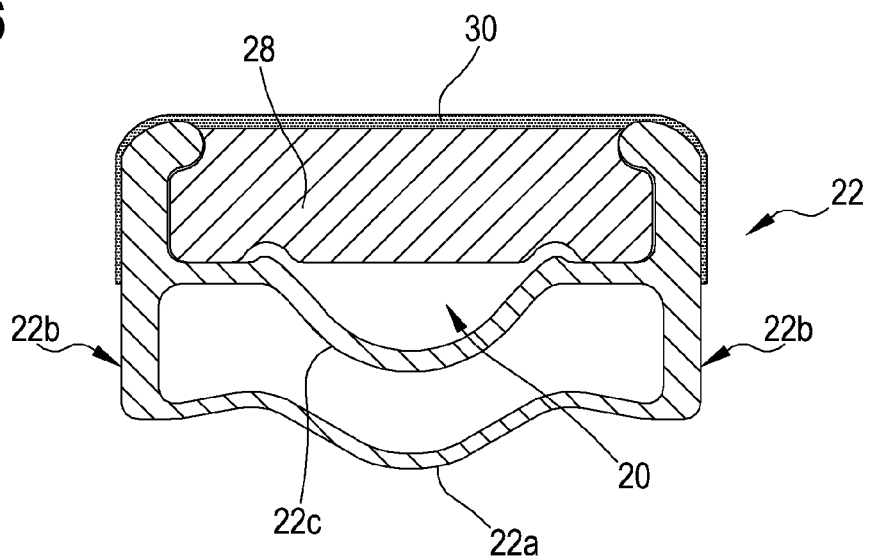
FIG. 6 schematically shows an enlarged radial section view of the aforementioned radially outer ring in the manufacturing step of FIG. 5.

FIG. 6 shows the removable protective film 30 deposited on the filler element 28 and on the radially outer circumferential portion of the radially outer ring 22. In particular, it can be seen how the removable protective film 30 is deposited on a radially outer portion of the side surfaces 22b of the radially outer ring 22.

At this point it is possible to subject the radially outer ring 22 to the deoxidation surface treatment, which preferably comprises an acid attack with sulphochromic mixture (FPL) and, more preferably, also anodising with phosphoric acid (PAA).

Before proceeding it is necessary for the anodic oxide generated by the previous oxidation surface treatment to be partially removed from the surface portion 23a of the radially outer ring 22 that is intended to be coupled with the radially inner ring 24.

For this purpose, a partial pickling is carried out in a suitable hot solution, for example an "Albrite" solution.

In particular, the radially outer ring 22 is locked on a frame that, typically, is made from titanium and is subjected to two pickling cycles of about 2 minutes each, followed by a desmutting and rinsing step. The same frame, suitably designed, can be used in the subsequent deoxidation surface treatment, without requiring the repositioning of the radially outer ring 22.

The aforementioned pickling does not allow a complete removal of the anodic oxide. Typically, at least 70-80% of the existing layer of anodic oxide is removed. The complete removal is obtained in the subsequent deoxidation surface treatment.

The radially outer ring 22, already positioned in the previous step on the titanium frame (which allows the localised electrical contact), is then subjected to the deoxidation surface treatment. Typically, there is no initial ultrasound washing step.

Figure 7:
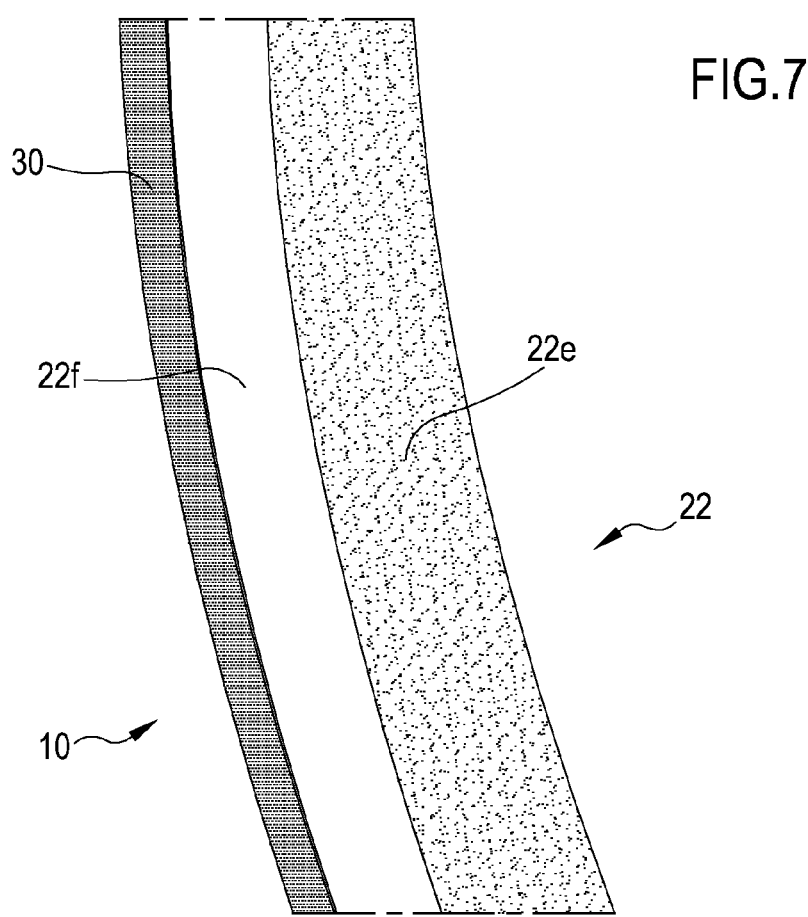
FIG. 7 schematically shows a perspective view of the aforementioned radially outer ring in a manufacturing step after that of FIG. 5.

For this purpose a corrosion inhibiting paint is applied on the surface portion 23a (FIG. 7). For example, it is possible to use the primer "BR® 127" discussed above.

The application of the aforementioned paint generally takes place through spraying. The firing of the paint is carried out in special ovens.

Then the removable protective film 30 is removed. Typically, the protective film 30 is cut with a blade avoiding damaging the filler element 28 below.

The protective film 30 can be easily peeled from the aluminium surface of the radially outer ring 22 and—since there are practically no chemical bonds with the filler element 28 made from fluoroelastomeric material—the detachment from the radially outer ring 22 is extremely easy. The filler element 28 can be reused.

Finally, the mask 26a is removed from the hole for the inflation valve 15. Thanks to the presence of such a mask 26a it has been possible to prevent the substances used in the deoxidation surface treatment from entering inside the seat 20 for the tyre 14, thus avoiding damaging or removing the anodic oxide present therein.

Once it has been verified that there is no discolouration in the seat 20, due to accidental infiltrations of liquid, the rim 10 is then packaged in a sealed bag.

FIGS. 8-18 show a right crank arm assembly (and its parts) that is wholly indicated with 110 and that constitutes a second embodiment of a bicycle component in accordance with the present invention.

Figure 8:
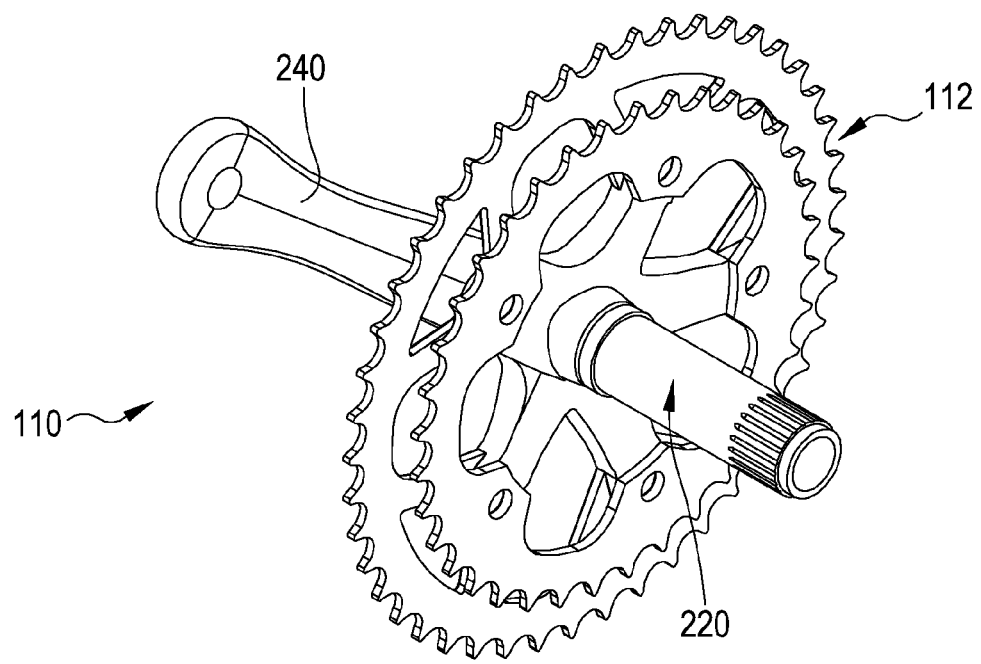
FIG. 8 schematically shows a perspective view of a right crank arm assembly according to the present invention.

The right crank arm assembly 110 shown in FIG. 8 comprises a pin 220 made from aluminium and a right crank arm 240 made from composite material. A plurality of toothed crowns 112 are mounted on the right crank arm 240.

More precisely, the pin 220 is a shaft or a half-shaft of a bicycle bottom bracket assembly. The shaft is coupled at its opposite ends, respectively, with the right crank arm 240 and with the left crank arm (not shown), whereas the half-shaft is coupled at its opposite ends, respectively, with the right crank arm 240 and with an end of a further half-shaft (not shown) which is coupled at an opposite end thereof with the left crank arm (not shown). In the example shown in FIGS. 8-18, the pin 220 is a shaft of a bicycle bottom bracket assembly.

Preferably, the pin 220 is hollow.

The right crank arm 240 is coupled with a surface portion 230a of the pin 220. Such a surface portion 230a is defined at an end 122a of the pin 220. The surface portion 230a can comprise a threading 123a for screwing the pin 220 into the right crank arm 240.

The remaining surface portion of the pin 220 is indicated with 230b.

The opposite end 122b of the pin 220, which is intended to be coupled with a left crank arm (not shown), comprises a grooved surface 123b.

In order to achieve the desired characteristics of resistance to corrosion, the surface portion 230b of the pin 220 is subjected to one of the aforementioned oxidation surface treatments.

In order to achieve excellent adhesion to the right crank arm 240, the surface portion 230a of the pin 220 is subjected to any of the aforementioned deoxidation surface treatments.

Also in this case, at first a corrosion inhibiting paint, for example the primer "BR® 127" described above and then a suitable adhesive substance is applied on the surface portion 230a.

Thanks to the fact that the surface portion 230a was prepared for gluing with one of the aforementioned deoxidation surface treatments, the gluing between pin 220 and right crank arm 240 has better characteristics of resistance to shearing stress with respect to those that would be obtained using different types of gluing preparation treatments. In this respect, totally analogous considerations to those given earlier for the bicycle rim 10, with particular reference to the gluing between radially outer ring 22 and radially inner ring 24, apply herein.

From the operative point of view, the method for manufacturing the right crank arm assembly 110 comprises the following steps shown in FIGS. 9-18. Such figures show, in particular, the processing steps which the pin 220 is subjected to.

Figure 9:
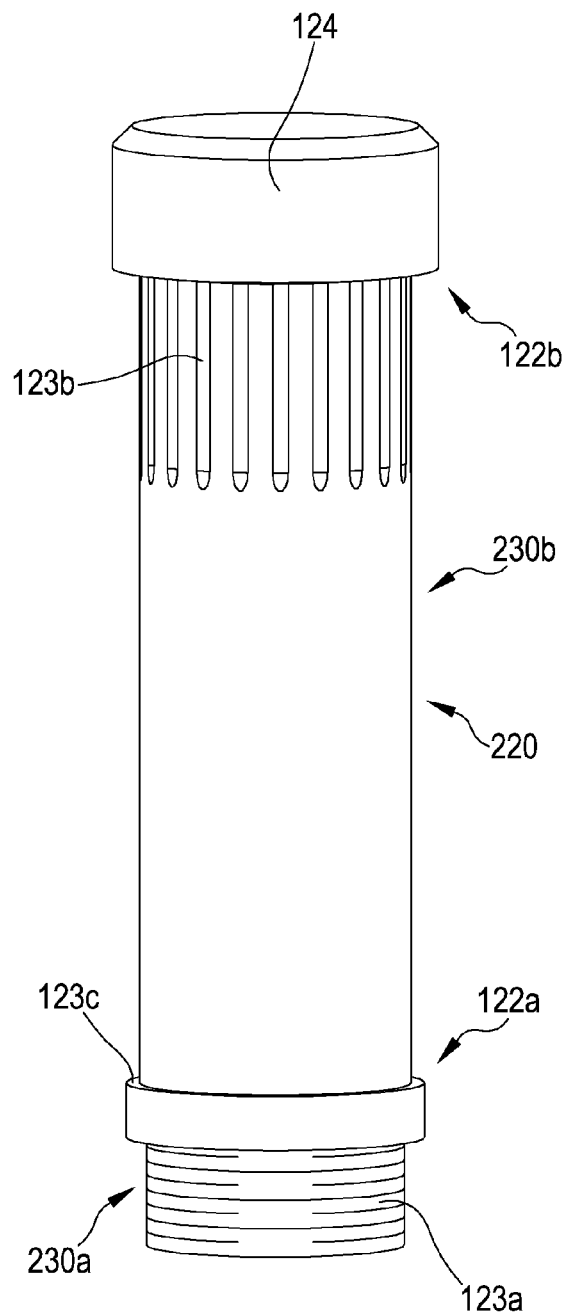
FIG. 9 schematically shows a perspective view of a pin of the right crank arm assembly of FIG. 8, in a manufacturing step thereof.

As shown in FIG. 9, a protective element 124 is applied on at least part of the grooved surface 123b of the pin 220. Typically a substantially cylindrical plug is used, which is mounted on the end 122b of the pin 220.

Then a peening treatment of the pin 220 thus prepared is carried out, for example using ceramic microballs having a diameter of about 0.20 mm.

The protective element 124 is then removed.

Figure 10:
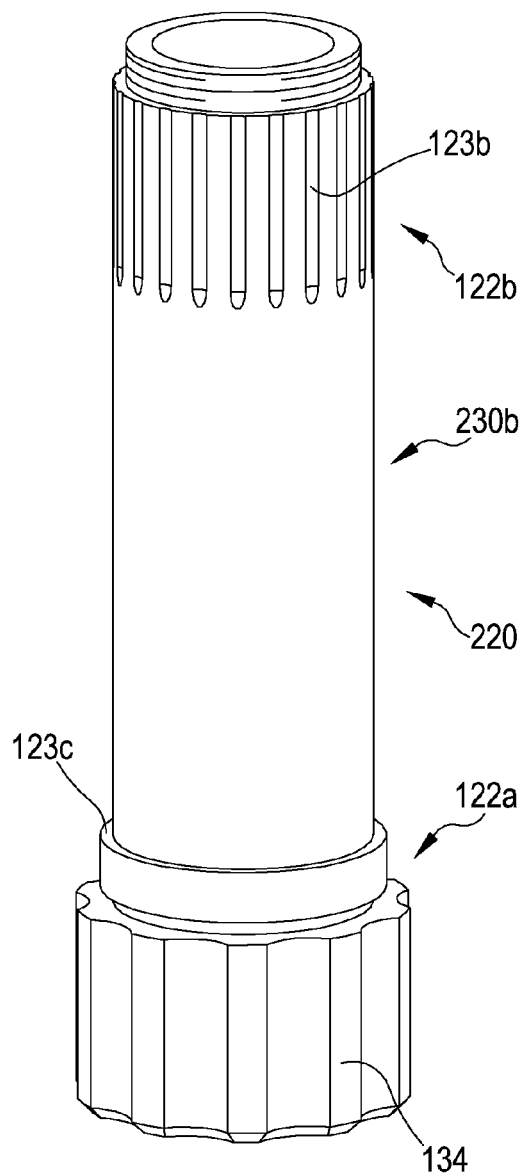
FIG. 10 schematically shows a perspective view of the aforementioned pin in a manufacturing step after that of FIG. 9, with a protective element mounted on said pin.

At this point the threading 123a of the pin 220 is covered by arranging a protective element 134 on its top, as shown in FIG. 10.

Figure 11:
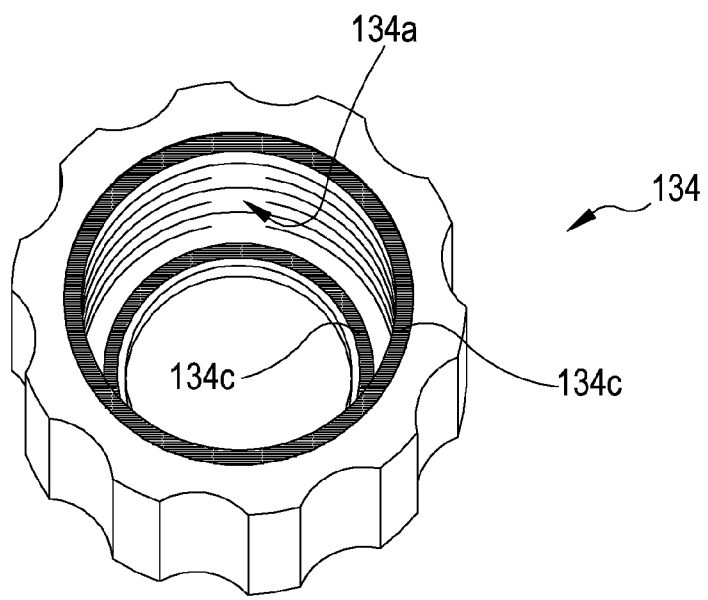
FIG. 11 schematically shows an enlarged perspective view of the protective element of FIG. 10.

Such a protective element 134 is more clearly shown in FIG. 11. It is substantially cylindrical, hollow and comprises an internal threading 134a, matching the threading 123a of the end 122a of the pin 220. The protective element 134 can thus be screwed into the threading 123a of the pin 220.

The protective element 134 comprises, at its opposite ends, two O-rings 134c. Such O-rings prevent the substances used in the subsequent oxidation surface treatment to come into contact with the threading 123a.

The pin 220 thus prepared is subjected to the oxidation treatment, preferably with fixing at 98° C. in aqueous nickel acetate solution. The thickness of the layer of anodic oxide that forms on the entire surface of the pin 220, including its hollow portion (excluding the area protected by the protective element 134) is for example 6-12 μm.

Figures 12, 13:
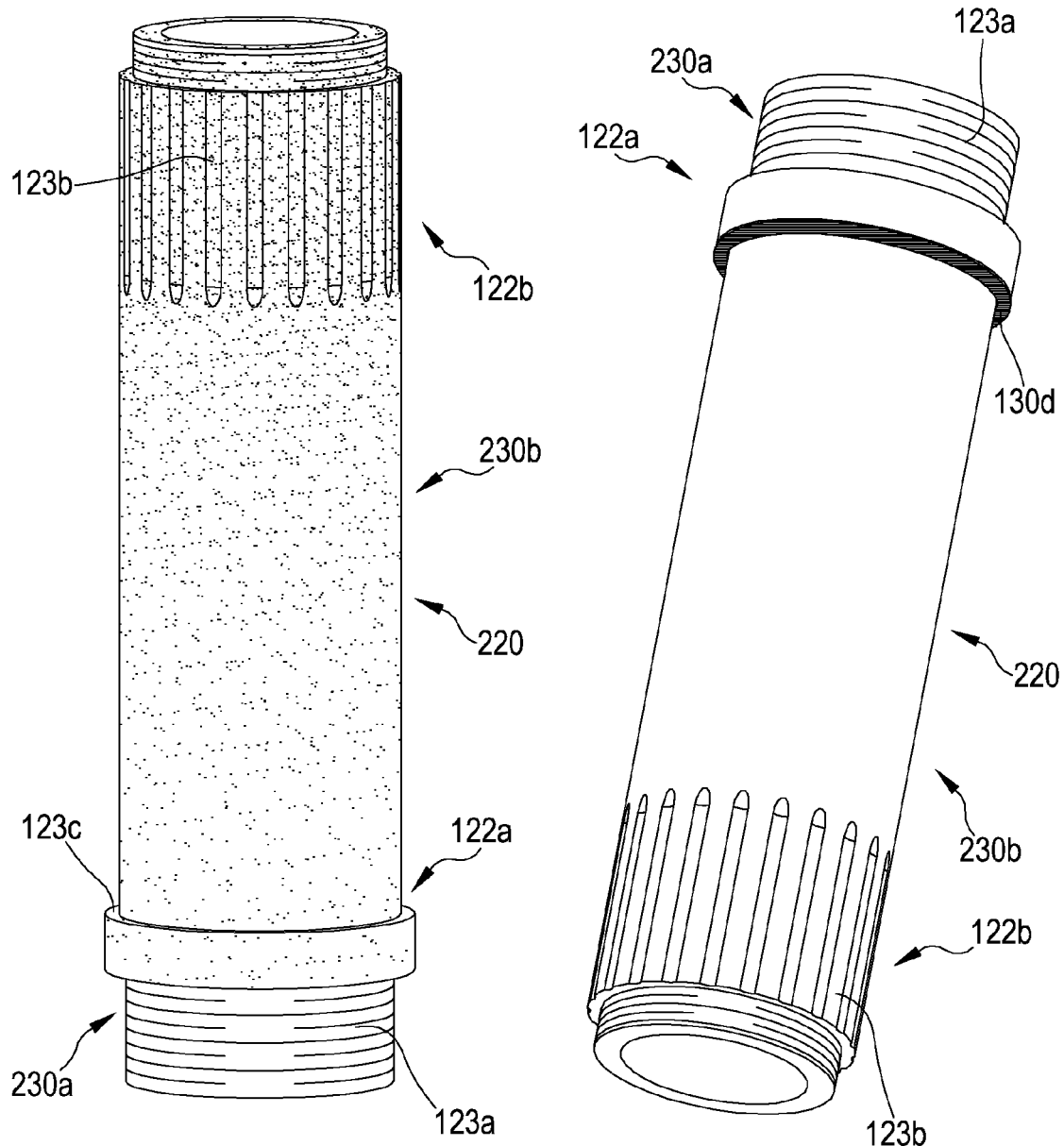

The protective element 134 is then removed, obtaining the pin 220 shown in FIG. 13.

At this point, the pin 220 is covered with a further protective element 300. Such a protective element 300 covers in particular the surface portions of the pin 220 that do not need to be subjected to the deoxidation surface treatment. Therefore, just the threading 123a is left uncovered, as shown in FIG. 16.

The protective element 300 comprises two parts 130a and 130b.

Figures 14, 15:
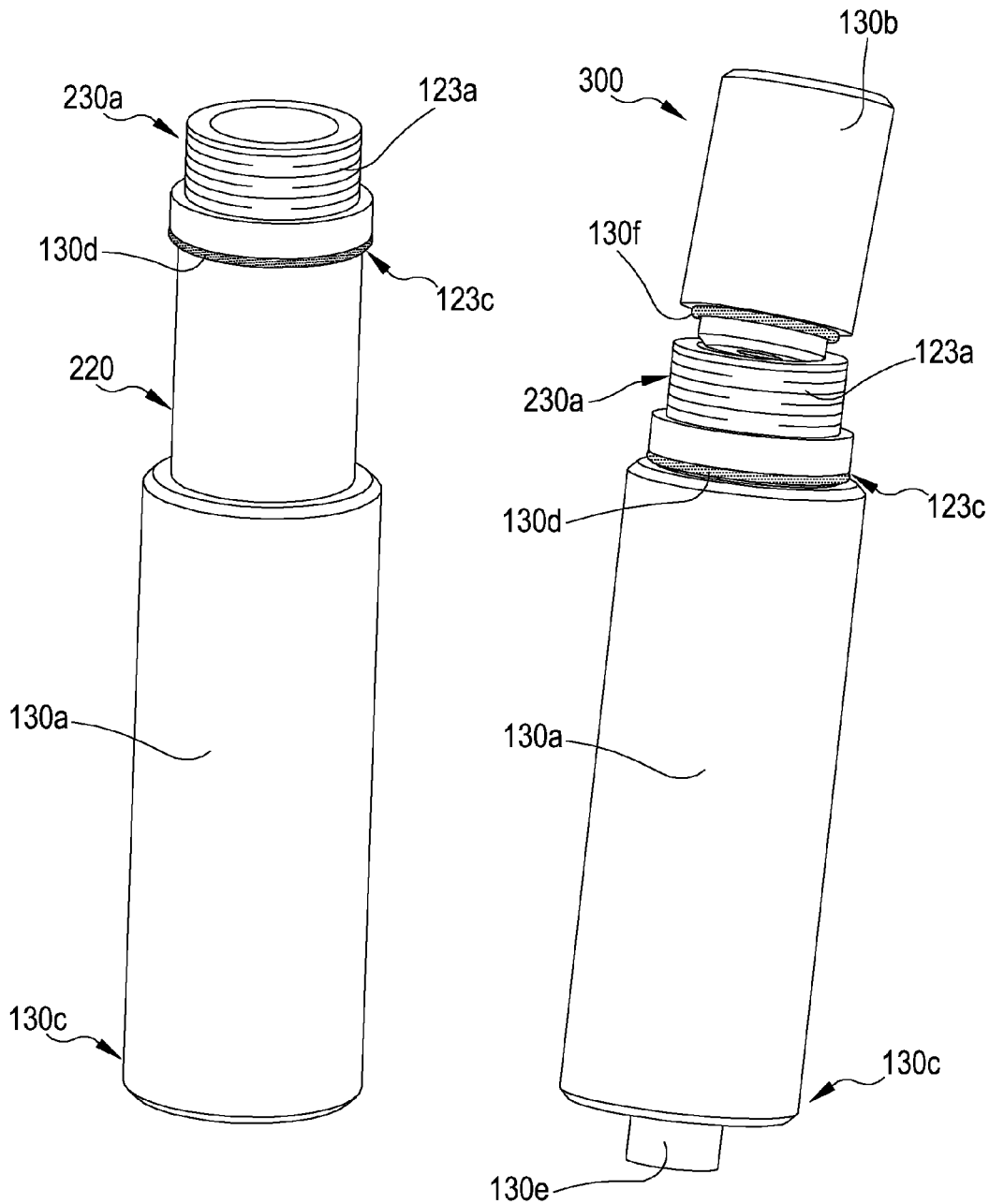

The part 130a has a substantially cylindrical shape closed at one end 130c and is fitted over the pin 220 from its end 122b (FIG. 14), until it reaches an annular abutment surface 123c of the pin 220 adjacent to the threading 123a (FIG. 15). FIG. 13 shows an O-ring 130d that is fitted over the pin 220 before insertion of the part 130a. The O-ring 130d remains interposed between the annular abutment surface 123c and the open end of the part 130a. The part 130a is closed with a fixing element 130e (FIG. 15).

The part 130b is substantially cylindrical and is inserted into the cavity of the pin 22 arranged at its end 122a (FIG. 15). The part 130b comprises an O-ring 130f that remains interposed between the part 130b and the end 122a of the pin 220.

The parts 130a and 130b can be made from plastic material.

The pin 220 thus prepared is subjected to the deoxidation surface treatment, which preferably provides for an acid attack with sulphochromic mixture (FPL) and, more preferably, also anodising with phosphoric acid (PAA). Thanks to the presence of the parts 130a and 130b, the cavity of the pin 220 has the opposite end faces closed; in this way the substances used in the deoxidation surface treatment are prevented from entering inside the aforementioned cavity and attacking the anodic oxide formed in the previous oxidation surface treatment.

Then the protective element 300 is removed.

Thereafter, a corrosion inhibiting paint is applied on the threading 123a. For example, it is possible to use the aforementioned primer "BR® 127".

The application of the aforementioned paint generally takes place through spraying, the remaining portion of the pin 220 having been previously covered with a cap 136, preferably made from metallic material.

The cap 136 has a substantially cylindrical shape closed at one end 136a. It is fitted over the pin 220 from its end 122b (FIG. 17), until it reaches an annular abutment surface 123c of the pin 220 (FIG. 18).

Then the cap 136 is removed.

The pin 220 thus treated is ready to be screwed and glued to the right crank arm 240.

Of course, a man skilled in the art can bring numerous modifications and variants to the bicycle components and to the relative manufacturing methods described above, in order to satisfy specific and contingent requirements, all of which are within the scope of protection of the present invention as defined by the following claims.

Although in the above description and in the following claims explicit reference to aluminium has been made, what has been stated is also valid in the case in which a different metallic material is used, for example magnesium and/or its alloys.

What is claimed is:

1. A bicycle component comprising:
    an aluminum body having a deoxidized surface portion and an oxidized surface portion;
    a composite material body adhesively coupled to at least one part of said deoxidized surface portion.

2. The bicycle component according to claim 1, wherein the bicycle component has a resistance to a shearing stress between said aluminium body and said composite material body that decreases by less than 20 MPa after 1500 hours of immersion in water.

3. The bicycle component according to claim 1, wherein the bicycle component has an initial resistance to a shearing stress between said aluminium body and said composite material body that is greater than 35 MPa.

4. The bicycle component according to claim 1, wherein said aluminum body is a pin of a right crank arm assembly and said composite material body is a right crank arm of said right crank arm assembly.

5. The bicycle component according to claim 1, wherein said aluminum body is a radially outer ring of a bicycle rim and said composite material body is a radially inner ring of said bicycle rim.

6. The bicycle component according to claim 5, wherein said aluminum body comprises a base surface and opposite side surfaces, wherein:
- a first surface portion is defined at said base surface and at a radially inner circumferential portion of each of said opposite side surfaces;
- a respective braking track of the rim is defined at a radially outer circumferential portion of each of said opposite side surfaces.

7. The bicycle component according to claim 1, wherein the bicycle component has a resistance to a shearing stress between said aluminium body and said composite material body that decreases by less than 18 MPa after 1500 hours of immersion in water.

8. The bicycle component according to claim 1, wherein the bicycle component has a resistance to a shearing stress between said aluminium body and said composite material body that decreases by less than 10 MPa after 1500 hours of immersion in water.

9. The bicycle component according to claim 1, wherein the bicycle component has a resistance to a shearing stress between said aluminium body and said composite material body that decreases by less than 5 MPa after 1500 hours of immersion in water.

10. The bicycle component according to claim 1, wherein the bicycle component has an initial resistance to a shearing stress between said aluminium body and said composite material body that is greater than 40 MPa.

11. The bicycle component according to claim 1, wherein the bicycle component has an initial resistance to a shearing stress between said aluminium body and said composite material body that is equal to about 45 MPa.

12. A method for manufacturing a bicycle component, said component comprising a first body made from aluminum and a second body made from composite material, said method comprising the following steps:
- carrying out a deoxidation surface treatment on a first surface portion of said first body;
- applying an adhesive substance on at least one part of said treated first surface portion;
- coupling said second body with said first body at said at least one part of said treated first surface portion; and
- carrying out an oxidation surface treatment with subsequent fixing of an oxide on at least one second surface portion of said first body.

13. The method according to claim 12, wherein said deoxidation surface treatment is an acid attack treatment with sulphochromic mixture (FPL).

14. The method according to claim 13, further comprising an anodizing treatment with chromic acid (CAA) with an oxide thickness less than or equal to 4 μm.

15. The method according to claim 8, further comprising an anodizing treatment including anodizing with phosphoric acid (PAA).

16. The method according to claim 12, wherein said oxidation surface treatment is an anodizing treatment with sulphuric acid (SAA).

17. The method according to claim 12, comprising, before applying said adhesive substance, a step of applying onto said first surface portion a corrosion inhibiting paint.

18. The method according to claim 12, wherein said oxidation surface treatment is carried out before carrying out said deoxidation surface treatment.

19. The method according to claim 12, wherein the step of carrying out said deoxidation surface treatment on said first surface portion of said first body is preceded by a step of covering said second surface portion with a first protective element.

20. The method according to claim 19, wherein said aluminum body is a radially outer ring of a bicycle rim, said radially outer ring comprising a seat for a tyre defined between opposite side surfaces, wherein the step of covering said at least one second surface portion comprises the following steps:
- inserting a filler element into said seat;
- applying a removable protective film on said filler element and on a radially outer circumferential portion of said radially outer ring.

21. The method according to claim 20, wherein said radially outer ring comprises a hole for an inflation valve and wherein said method comprises the step of covering said hole with a first mask before inserting said filler element into said seat.

22. The method according to claim 12, wherein the step of carrying out the oxidation surface treatment on said at least one second surface portion of said first body comprises the following steps:
- carrying out said oxidation surface treatment on said first surface portion and second surface portion to form an anodic oxide; and,
- at least partially removing said anodic oxide from said first surface portion.

23. The method according to claim 12, wherein said first body is a hollow pin of a right crank arm assembly with open opposite end faces and wherein the step of carrying out said deoxidation surface treatment is preceded by a step of closing the opposite end faces of said hollow pin.

24. The method according to claim 12, wherein the step of carrying out the oxidation surface treatment on said at least one second surface portion of said first body is preceded by a step of covering said first surface portion with a second protective element.

* * * * *